Patented Nov. 13, 1928.

1,691,765

UNITED STATES PATENT OFFICE.

LESTER KIRSCHBRAUN, OF CHICAGO, ILLINOIS.

PROCESS OF MAKING EMULSION PAINTS.

No Drawing.  Application filed May 7, 1925. Serial No. 28,736.

This invention relates to a process of making an emulsion paint, and in its broader aspects has to do with the process of producing bituminous emulsions or dispersions generally.

In previous processes of manufacturing emulsion paints, described in my pending applications, such as Serial No. 582,309 filed August 16, 1922, Serial No. 666,453 filed October 4, 1923, and Serial No. 713,725 filed May 16, 1924, there is employed as an emulsifying agent colloidal clay, bentonite or some similar earthy powder. I have found that the use of emulsifying agents of clay type are in some instances disadvantageous, particularly in the presence of certain pigments. The effect of certain pigments upon emulsions of this type, is to produce slow changes which are evidenced by "jelling" or a progressive increase in viscosity of the clay-pitch-pigment-water composition. This effect is particularly noticeable where a paint is prepared of a stearine base pitch dispersed with bentonite and carrying as a coloring material a chrome green pigment which latter is composed of lead chromate and Prussian blue. It has been observed that where paint is made of the constituents above referred to, and immediately used, such paint appears to be satisfactory. On long standing however, in closed containers, progressive solidification takes place so that in the course of months the material reaches the consistency of a heavy jell, and if diluted with water and then used as a paint, the resultant dry film possesses no life or adhesion, but becomes easily removable by washing and weather.

The same emulsion base with certain other pigments, as for example, oxide of iron, does not produce this effect at all. It is found to result to a marked degree only when the three phases—pitch, bentonite and pigment are present in the aqueous dispersion. In other words, if the pitch emulsion itself is permitted to stand, little or no change of viscosity takes place, and if only bentonite and pigment are mixed together without dispersed pitch, little or no change takes place.

Just what the mechanism of this change is, I am unable to state, although it appears to partake of the nature of progressive peptization which may be due possibly to the gradual development of basicity in the emulsion originating in the breaking down of the alkali silicates of the bentonite. The product of this action possesses a jelly-like structure which upon agitation appears to become momentarily more fluid, returning however to the jelly-like structure within a reasonable time. It behaves as if it had developed more colloidality.

Paint produced from a product of this character is defective, lacks coherence, water resistance, and has been found unsatisfactory in practical use. I have found that the product of this ageing process has developed the ability to disperse further quantities of paint base such as stearine pitch, resins and similar paint bases referred to in my previous applications. This emulsification takes place without the use of any further quantity of clay or emulsifying agent such as was used originally to produce the paint dispersion. In other words, the aged paint has apparently developed the property of acting as an emulsifying agent itself.

In making an emulsion in which this old paint is employed as the "mother", I use about 50 pounds of such paint which comprises about 2 pounds of the bentonite originally used for emulsification. With 50 pounds of the old paint, I have been able to disperse 100 pounds of pitch, this resulting in a pitch bentonite ratio in the final product of over 50 to 1. To the emulsion thus produced, I may add further quantities of pigment and by the addition of water, the product is brought to a suitable consistency for applying with a brush. Paint thus made, appears to develop no further jellying action, and dries to a coherent water-resisting film.

The above is descriptive of one of the methods of producing a new dispersion from an old one in which the pigment employed was capable of producing the ageing action heretofore described.

I have found it advantageous in many instances, instead of adding the pigment after the emulsification with the old paint is completed, to use this pigment combined with the old paint as an emulsifying agent. In some cases the old paint may be dispensed with, either partly or entirely, so that the final product contains no clay at all, but has been dispersed by means of a finely divided mineral pigment in aqueous paste form.

It has been observed in carrying out processes with chrome green pigment that in some instances different batches of such pigment would not emulsify with the same pitch with equal readiness, and in other instances, pigments that would emulsify satisfactorily with one pitch would not do so with another. It has been found by investigating a number of observations of this kind that one of the important factors in controlling the emulsification with the mineral powder or pigment, has been the need of maintaining the pigment at a reasonably constant hydrogen-ion concentration. It has been found this hydrogen-ion concentration should be constant or reasonably so for pitch of a constant character. Where, however, different pitches are employed, the mineral powder used as an emulsifying agent must be modified as to its hydrogen-ion concentration to a figure suitable for the particular pitch. At present this is determined empirically for any pitch by finding a clay or other mineral powder that can successfully emulsify such pitch and determine the hydrogen-ion concentration thereof when contained in an aqueous vehicle.

As an example of the preparation of an emulsion or dispersion of the character here referred to, a paint base is prepared comprising approximately 80% stearine pitch of 100° F. melting point, and 20% of paracumarone of 150° F. melting point. These materials are fluxed together and the quantities adjusted until the final base has a penetration of above 150 to 170, as determined by well known methods. To disperse this base there may be employed about 30 parts by weight of chrome green pigment previously worked up into paste form. This chrome green pigment should preferably have a hydrogen-ion concentration of 6.5–7.0 but if it be acidic, it may be brought up by the addition of regulated quantities of calcium carbonate, asbestine, bentonite or other materials of slightly alkaline nature, preferably in the form of finely divided powder. The batch thus prepared of correct hydrogen-ion concentration is heated to between 120 and 180° F. and the pitch preferably to above the boiling point of water, is introduced slowly with active agitation until approximately 100 parts of pitch is incorporated and dispersed throughout the batch. During this dispersing operation, water is added from time to time so as to maintain a uniform consistency of the batch.

The same type of operation may be carried out not only with animal pitches, but also with asphalt, bitumens and fusible compositions of like nature prepared from resins with softening oils. A wide variety of mineral powders may be employed provided they are finely divided and are characterized by some plasticity when in paste form and are adjusted as to their hydrogen-ion concentration in relation to the requirements of the particular pitch to be emulsified. Such powders as iron oxide, slate dust, gypsum, barytes, whiting, ochres have been successfully employed under the conditions heretofore stated, either alone or modified with small quantities of clay or bentonite. As one example of the use of one of the finely divided mineral powders discussed in this paragraph, 50 parts of ochre in water may be used to disperse 100 parts of the paint base heretofore referred to. The ochre is preferably adjusted to the same pH consentration relative the paint base as already described for the chrome green pigment. It will be readily understood by those skilled in the art that the particular kind of finely divided powder to be used with a particular kind of pitch, and the proportions used, may vary widely within the scope of the invention depending upon the type of product desired and the character of the pitch and powder.

In certain instances, this powder may be incorporated into the pitch in a dry condition by agitating with a molten base and this mixture then incorporated with an aqueous medium containing a finely divided pigment in paste form and agitated to disperse the pitch in the aqueous medium, or the pigment in aqueous paste form may be added to the base in such a way as to produce a dispersion therein, the pitch constituting the continuous phase while the pigment and water constitute the dispersed phase. This base which is now in emulsion form, may then be added to the mineral powder in aqueous paste form which is employed as the emulsifying agent, the result being that the initial emulsion (water-in-oil type) is inverted upon dispersion so as to bring the water into the external phase and the base into the internal phase. Ammonia frequently assists the inversion.

Dispersions of the character resulting from the above operation do not jell, and when painted out, dry to a coherent continuous film which is highly water-resistant and durable upon exposure.

Dispersions of this kind particularly where prepared with heavy powders and where the particle size is not small, tend to settle out upon standing. Where this occurs, it may be desirable to incorporate a small quantity of suspending agent such as one-half to one percent of bentonite, asbestine, agar or a small amount of suspending gum.

In certain instances where it is not desired to change the hydrogen-ion concentration of the pigment, but rather to change the pitch, emulsification may be brought about by addition to the pitch of portions of a pigment or a mineral powder which apparently functions to change the hydrogen-ion concentration required of the emulsifying powder.

I claim as my invention:

1. A process of making an aqueous emulsion paint which comprises dispersing a paint base in an aqueous medium by means of a finely divided pigment in an aqueous paste form adjusted to a predetermined hydrogen ion concentration, said pigment being of such character as to impart a distinct color to the final product.

2. A process of making a paint which comprises dispersing a paint base containing finely divided mineral powder, by means of a finely divided pigment adjusted to a predetermined hydrogen ion concentration in an aqueous medium, said pigment of such character as to impart a distinct color to the final product.

3. A process of making an aqueous emulsion, which comprises dispersing a non-fluid bitumen pitch type base in an aqueous medium with a finely divided pigment and adjusted to a predetermined hydrogen ion concentration, said pigment being of such character as to impart a distinct color to the final product.

4. A process of making an aqueous emulsion paint, which comprises dispersing a fusible colorable bitumen in an aqueous medium by means of a finely divided pigment in an aqueous paste form adjusted to a predetermined hydrogen ion concentration, said pigment being of such character as to impart a distinct color to the final product.

5. A process of making an aqueous emulsion paint which comprises dispersing a colorable pitch in an aqueous medium by means of a finely divided pigment in an aqueous paste form adjusted to a predetermined hydrogen ion concentration, said pigment being of such character as to impart a distinct color to the final product.

LESTER KIRSCHBRAUN.